Nov. 14, 1933.  S. B. HASELTINE  1,934,851
FRICTION SHOCK ABSORBING MECHANISM
Filed Aug. 29, 1931
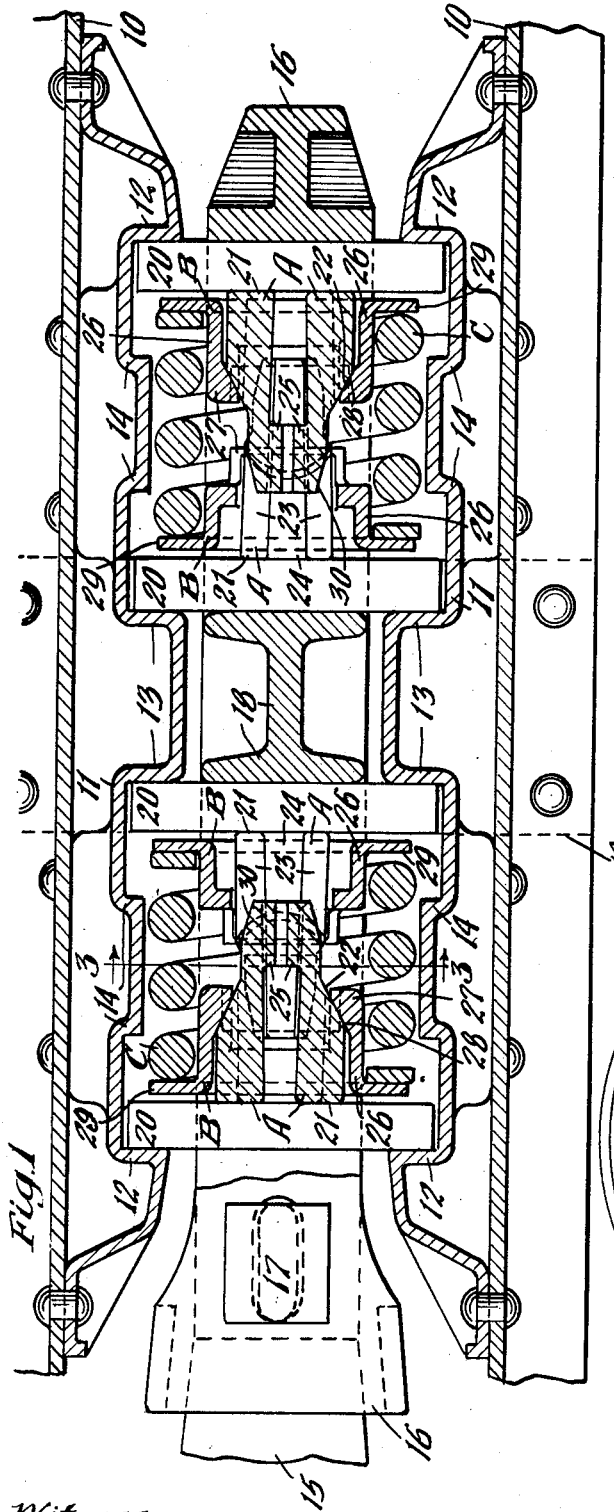
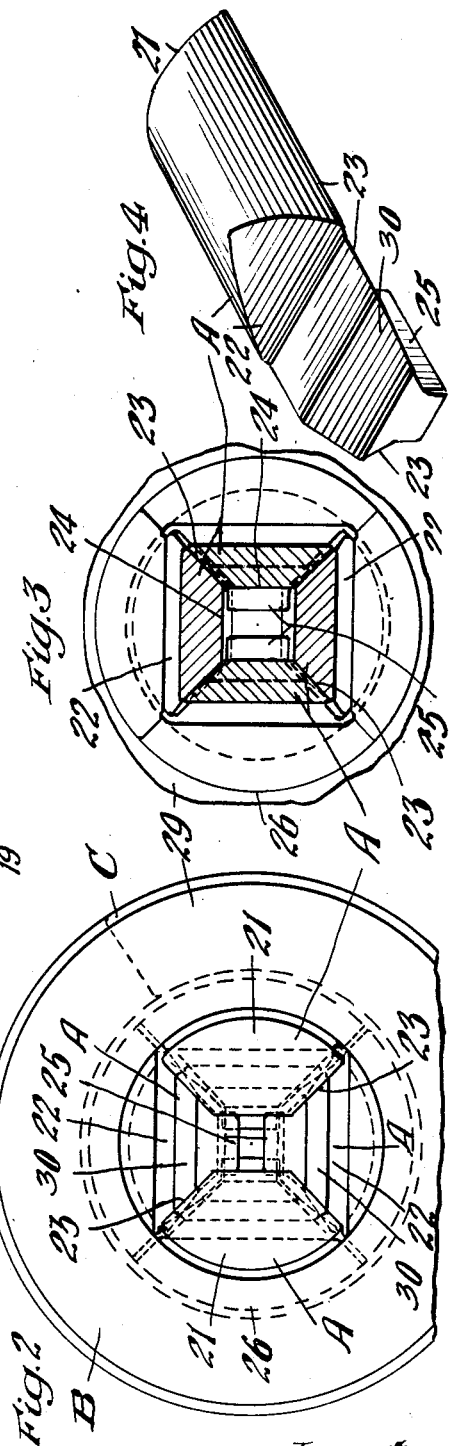
Inventor
Stacy B. Haseltine
Witness
Wm. Geiger
By Henry Fuchs, Atty.

Patented Nov. 14, 1933

1,934,851

UNITED STATES PATENT OFFICE 1,934,851

FRICTION SHOCK ABSORBING MECHANISM

Stacy B. Haseltine, Chicago, Ill., assignor to W. H. Miner, Inc., Chicago, Ill., a corporation of Delaware Application August 29, 1931. Serial No. 560,128

7 Claims. (Cl. 213—22)

This invention relates to improvements in friction shock absorbing mechanisms.

One object of the invention is to provide a friction shock absorbing mechanism especially designed for use in connection with railway draft riggings, including the usual tandem stop members and cooperating yoke means, the unit being of simple design and high shock absorbing capacity, and two such units replacing the usual springs of the tandem rigging, thereby giving greatly increased cushioning effect over that provided by the tandem spring arrangement.

Another object of the invention is to provide a friction shock absorbing mechanism in the form of a simple, compact unit of high shock absorbing capacity provided by a plurality of similar friction elements having engagement on friction surfaces disposed lengthwise of the mechanism and being relatively slidable with respect to each other, together with duplicate spring follower members having wedging engagement with the friction elements to force the same toward each other and into tight frictional contact, wherein the spring followers are movable toward each other during compression of the mechanism and relative movement thereof is opposed by spring means.

Other objects of the invention will more clearly appear from the description and claims hereinafter following.

In the drawing, forming a part of this specification, Figure 1 is a horizontal, longitudinal sectional view through the underframe structure of a railway car, illustrating my improvements in connection therewith. Figure 2 is a front end elevational view, on an enlarged scale, of the friction shock absorbing device disposed at the left-hand end of the mechanism, as seen in Figure 1. Figure 3 is a transverse, vertical sectional view, also on an enlarged scale, corresponding substantially to the line 3—3 of Figure 1, said view being partly broken away. And Figure 4 is a detailed prospective view of a friction wedge element employed in connection with my improved mechanism.

In said drawing, 10—10 indicate channel-shaped center or draft sills of the railway car underframe, to the inner sides of which tandem stop castings 11—11 of well-known form are secured. Each stop casting is provided with front and rear main stop shoulders 12—12, a pair of middle main stop shoulders 13—13, and front and rear pairs of intermediate limiting stop shoulders 14—14 and 14—14. The coupler of the draft rigging, the shank only of which is shown, is indicated by 15 and is connected to a vertical yoke 16 by a key 17. The yoke is of the usual type employed in connection with tandem spring gears and has a central filler member 18, which is formed rigid with the top and bottom arms of the yoke. A saddle plate 19, which is secured to the bottom flanges of the sills 10—10, supports the yoke for sliding movement. The yoke contains the usual two sets of front and rear followers 20—20 and 20—20.

In carrying out my improvements, I employ two friction shock absorbing devices in connection with the railway draft rigging illustrated in Figure 1, said devices being substituted for the usual tandem springs. As shown, the two devices are preferably reversely arranged.

Each of my improved shock absorbing mechanisms, or devices, includes four friction wedge elements A—A—A—A, two spring followers B—B, and a main spring resistance C.

The four friction elements A—A—A—A of each friction shock absorbing mechanism are arranged in pairs, the members of which are alternated and cooperate with the front and rear main followers 20—20 of the corresponding unit. The elements A are all of like design. Each element A, as most clearly shown in Figures 1, 3, and 4, is in the form of a bar or block having a flat outer end face 21, which bears directly on the corresponding main follower 20. Intermediate its ends, the element A is provided with an outer wedge face 22, which cooperates with the corresponding spring follower B, as hereinafter pointed out. On the opposite side to the wedge face 22, the element A has a pair of flat friction surfaces 23—23, which are separated by an intermediate flat face 24. The friction surfaces 23—23 are substantially radial to the longitudinal axis of the mechanism and preferably converge toward the inner end of the element. Each friction element also has a laterally inwardly projecting lug 25 at the inner end thereof, which cooperates with similar lugs of others of the friction elements A, as hereinafter pointed out. In each friction shock absorbing unit, the friction elements A are arranged in two sets or pairs, the members of said sets or pairs bearing respectively on the two main followers 20—20. The members of one set are alternated with the members of the other set and have the friction surfaces 23—23 thereof in contact with the friction surfaces 23—23 at the corresponding sides of the two elements A—A of the other set. The lugs 25—25 of the two pairs or sets of elements are overlapped and have shouldered engagement with each other so as to limit longitudinal separation of the two sets of elements.

The two spring followers B—B are of like design and are arranged at opposite ends of the friction shock absorbing unit. Each follower B has a sleevelike portion 26, which is telescoped over the ends of the friction elements A—A. On diametrically opposite sides, each spring follower is provided with wall sections 27—27 projecting inwardly beyond the sleevelike portion 26. The wall sections 27—27 are provided with interior opposed wedge faces 28—28, which engage the wedge faces 22—22 of the cooperating pair of friction wedge elements A—A. As most clearly shown in Figure 1, the spring followers B—B are so arranged that the wedge faces of one spring follower are disposed at opposite sides of the mechanism while the wedge faces of the other spring follower are disposed at the top and bottom of the mechanism. At the outer end, the sleeve section 26 of each spring follower B is provided with a laterally projecting annular flange 29, which forms abutment means for the spring resistance C. At the inner end, as most clearly shown in Figures 1 and 4, each friction wedge element A is cut away, as indicated at 30, to facilitate assembling of the friction elements with the spring followers of the mechanism. As shown in Figure 1, the parts are so proportioned that the outer ends of each pair of friction wedge elements A—A project outwardly beyond the corresponding spring follower B, thereby spacing the spring follower from the corresponding main follower 20. The actuating force is thus delivered directly to the outer ends of the friction wedge elements A—A.

The main spring resistance C of each friction shock absorbing mechanism preferably is in the form of a single, relatively heavy coil surrounding the friction wedge elements A—A and the sleeve sections 26—26 of the spring followers B—B and having its opposite ends bearing on the flanges 29—29 of said spring followers.

In the operation of the draft rigging, the follower 20 at the forward end of the mechanism and the follower 20 immediately to the rear of the filler member 18 of the yoke will be forced rearwardly in buff, thereby compressing the two friction shock absorbing mechanisms. In draft, the action is the reverse, the rearmost follower 20 and the follower 20 immediately in front of the filler member 18 being pulled forwardly by the yoke toward the remaining two followers 20—20.

During compression of each friction shock absorbing mechanism, the pairs of friction wedge elements will be forced toward each other lengthwise of the mechanism, thereby causing a wedging action to be set up between said elements and the two spring followers B—B. The friction wedge elements of said two pairs will thus be forced laterally inwardly toward each other, causing tight frictional engagement between the cooperating friction surfaces 23—23 thereof. At the same time, the members of each pair of elements A—A will be slid longitudinally on the friction surfaces of the members of the other pair of elements A—A, while the spring resistance C is compressed between the spring followers B—B, which are carried inwardly toward each other through the wedging action thereof with the two pairs of friction wedge elements A—A and A—A. Due to the inclination of the cooperating friction surfaces 23—23 of the friction wedge elements A—A, a differential action will be set up, thereby progressively augmenting resistance during the compression of the mechanism.

In release, when the actuating force is reduced, the expansive action of the spring resistance C will force the spring followers B—B apart, and the friction elements of the two pairs A—A and A—A will be carried outwardly with said spring followers until arrested by engagement of the lugs 25—25 with each other.

When the mechanism is fully compressed, the main followers 20—20 will engage the flat inner end portions of the two pairs of friction wedge elements A—A and A—A, whereby the elements A—A act as a solid column load-transmitting means restricting the wedging action and protecting the spring followers B—B against damage through excessive expansion thereof, which might result in bursting of the followers.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with two sets of longitudinally disposed friction elements having frictional engagement with each other, said sets being relatively movable with respect to each other lengthwise of the mechanism, each element of each set having a wedge face; of a pair of spring followers movable toward each other, each spring follower having interior wedge faces having wedging engagement with the wedge faces of the elements of one of said sets, each of said sets of elements projecting outwardly beyond the corresponding spring follower to receive the actuating force; and spring resistance means opposing relative approach of said spring followers.

2. In a friction shock absorbing mechanism, the combination with two sets of longitudinally disposed friction elements having frictional engagement with each other along surfaces substantially radial to the longitudinal axis of the mechanism, each of said elements having a wedge face on the outer side thereof, said sets being relatively movable with respect to each other lengthwise of the mechanism; of a pair of spring followers movable toward each other, said spring followers being telescoped over said elements, each spring follower having interior wedge faces in wedging engagement with the elements of one of said sets, each of said sets of elements projecting outwardly beyond the cooperating spring follower to receive the actuating force; and spring resistance means bearing at opposite ends on said spring follower and opposing relative approach of said spring followers.

3. In a friction shock absorbing mechanism, the combination with two pairs of longitudinally disposed friction elements, the members of one pair being alternated with the members of the other pair and having frictional engagement with each other on surfaces disposed lengthwise of the mechanism, the members of one pair being movable lengthwise with respect to the members of the other pair; of a pair of spring followers at opposite ends of said elements, said spring followers being relatively movable toward each other, each spring follower having inward wedging engagement with one pair of said elements, and said last named pair of elements projecting outwardly of the corresponding spring follower to receive the actuating force; and a spring resistance opposing relative approach of said spring followers.

4. In a friction shock absorbing mechanism, the combination with a plurality of longitudinally disposed friction elements having frictional engagement with each other and being movable with reference to each other lengthwise of the mechanism, each element having a wedge face thereon; of a pair of spring followers having sleeve sections surrounding said elements, each sleeve section having opposed interior wedge faces, the wedge faces of said sleeves being in wedging engagement with the wedge faces of said elements, said elements projecting outwardly beyond the spring followers to receive the actuating force; and spring resistance means interposed between said spring followers and yieldingly opposing relative approach of the same.

5. In a friction shock absorbing mechanism, the combination with two sets of longitudinally disposed friction elements, the elements of said two sets being reversely tapered and having frictional engagement with each other along the tapered portions thereof, said sets being relatively movable with respect to each other lengthwise of the mechanism; of a pair of sleevelike spring followers movable toward each other, each spring follower having interior wedge faces having wedging engagement with one of said sets of elements, each of said sets of elements projecting outwardly beyond the corresponding spring follower to receive the actuating force; and spring resistance means opposing relative approach of said spring followers.

6. In a friction shock absorbing mechanism, the combination with two pairs of longitudinally disposed friction elements, the members of one pair being alternated with the members of the other pair and having frictional engagement with said pair on surfaces disposed lengthwise of the mechanism and inclined to the longitudinal axis thereof, the members of one pair being movable lengthwise with respect to the members of the other pair; of a pair of sleevelike spring followers telescoped over opposite ends of said elements, said spring followers being relatively movable toward each other, each spring follower having a pair of opposed interior wedge faces having wedging engagement with one pair of said elements, each of said pair of elements projecting outwardly beyond the corresponding spring follower to receive the actuating force; and spring resistance means surrounding said elements and sleevelike spring followers and having shouldered engagement with the latter to yieldingly oppose relative approach of the same.

7. In a railway draft rigging, the combination with a pair of main followers movable toward and away from each other; of two sets of friction elements between said main followers, the outer ends of the members of one set bearing on one main follower and the outer ends of the members of the other set bearing on the other main follower, the inner ends of said sets being normally spaced from said main followers respectively and adapted to be engaged thereby when the mechanism is fully compressed to limit the approach of the main followers, said elements having frictional engagement with each other on surfaces extending lengthwise of the mechanism; a pair of spring followers spaced from said main followers and having interior opposed wedge faces, the wedge faces of said spring followers having wedging engagement with said two sets of friction elements respectively to force the same laterally inwardly toward each other; and a spring resistance yieldingly opposing relative approach of said followers.

STACY B. HASELTINE.